(12) United States Patent
Sanz Martinez et al.

(10) Patent No.: US 11,414,203 B2
(45) Date of Patent: Aug. 16, 2022

(54) ACTIVE LAMINAR FLOW CONTROL PLENUM PANEL ARRANGEMENT

(71) Applicant: Rohr, Inc, Chula Vista, CA (US)

(72) Inventors: Pablo T. Sanz Martinez, San Diego, CA (US); Johann Steven Schrell, San Diego, CA (US); Thomas Paolini, Felton, CA (US)

(73) Assignee: Rohr, INC., Chula Vista, CA (US)

( * ) Notice: Subject to any disclaimer, the term of this patent is extended or adjusted under 35 U.S.C. 154(b) by 993 days.

(21) Appl. No.: 16/147,125

(22) Filed: Sep. 28, 2018

(65) Prior Publication Data

US 2020/0102083 A1 Apr. 2, 2020

(51) Int. Cl.
| | |
|---|---|
| *B64D 33/02* | (2006.01) |
| *B64C 1/12* | (2006.01) |
| *B64C 21/06* | (2006.01) |
| *B64D 29/00* | (2006.01) |
| *B64C 1/00* | (2006.01) |

(52) U.S. Cl.
CPC .............. *B64D 33/02* (2013.01); *B64C 1/12* (2013.01); *B64C 21/06* (2013.01); *B64D 29/00* (2013.01); *B64C 2001/0072* (2013.01); *B64C 2230/22* (2013.01); *B64D 2033/0226* (2013.01)

(58) Field of Classification Search
CPC ....... B64C 21/02; B64C 21/025; B64C 21/04; B64C 21/06; B64C 2230/22; B64D 2033/0206; B64D 2033/0226
See application file for complete search history.

(56) References Cited

U.S. PATENT DOCUMENTS

| | | | |
|---|---|---|---|
| 2,742,247 A | 4/1956 | Gustav | |
| 3,194,518 A | 7/1965 | Walsh | |
| 4,556,591 A | 12/1985 | Bannink, Jr. | |
| 4,858,721 A * | 8/1989 | Autie | F02K 1/827 |
| | | | 181/224 |
| 5,316,032 A | 5/1994 | DeCoux | |

(Continued)

FOREIGN PATENT DOCUMENTS

| | | |
|---|---|---|
| DE | 936618 | 12/1955 |
| EP | 0585561 | 3/1994 |

(Continued)

OTHER PUBLICATIONS

European Patent Office, European Office Action dated Oct. 27, 2021 in Application No. 19195429.6.
European Patent Office, European Office Action dated Oct. 27, 2021 in Application No. 19195211.8.

(Continued)

*Primary Examiner* — Nicholas McFall
(74) *Attorney, Agent, or Firm* — Snell & Wilmer L.L.P.

(57) ABSTRACT

An active laminar flow control arrangement may comprise an outer skin having an inner surface, an outer surface, and a perforated area, and a panel coupled to the inner surface. The panel may comprise a longitudinal wall, a sidewall extending from the longitudinal wall, a ridge intersecting the sidewall, a cavity disposed in the panel and at least partially defined by the sidewall and the longitudinal wall, and a division wall disposed in the cavity and extending from the longitudinal wall, wherein the division wall divides the cavity into a first plenum and a second plenum. The longitudinal wall, the sidewall, the ridge, and the division wall may comprise a single, monolithic piece.

19 Claims, 7 Drawing Sheets

(56) References Cited

U.S. PATENT DOCUMENTS

| | | | |
|---|---|---|---|
| 5,366,177 | A | 11/1994 | DeCoux |
| 5,368,258 | A | 11/1994 | Johnson et al. |
| 8,783,624 | B2 | 7/2014 | Koppelman et al. |
| 9,663,238 | B2 | 5/2017 | Kane et al. |
| 2008/0111024 | A1 | 5/2008 | Lee et al. |
| 2010/0276548 | A1 | 11/2010 | Porte et al. |
| 2011/0005188 | A1 | 1/2011 | Roger |
| 2016/0263878 | A1* | 9/2016 | Weaver .................. B32B 37/12 |
| 2016/0311520 | A1 | 10/2016 | Khidekel |
| 2017/0096230 | A1* | 4/2017 | Surply .................... F02C 7/047 |
| 2019/0202566 | A1 | 7/2019 | Heckl |

FOREIGN PATENT DOCUMENTS

| | | |
|---|---|---|
| EP | 1232944 | 8/2002 |
| EP | 3093236 | 11/2016 |
| EP | 3159259 | 4/2017 |
| EP | 3205491 | 8/2017 |
| GB | 2252076 | 7/1992 |
| WO | 9221560 | 12/1992 |

OTHER PUBLICATIONS

European Patent Office, European Office Action dated Apr. 13, 2021 in Application No. 19191006.6.
European Patent Office, European Search Report dated Feb. 4, 2020 in Application No. 19195429.6.
European Patent Office, European Search Report dated Feb. 26, 2020 in Application No. 19191006.6.
European Patent Office, European Search Report dated Jan. 27, 2020 in Application No. 19195211.8.
Pablo T. Sanz Martinez et al, U.S. Appl. No. 16/147,064, filed Sep. 28, 2018 and entitled "Active Laminar Flow Control Structural Plenums Fastened".
Pablo T. Sanz Martinez et al, U.S. Appl. No. 16/147,145, filed Sep. 28, 2018 and entitled "Active Laminar Flow Control Plenum Panel Arrangements and Installation Methods".
USPTO, Pre-Interview First Office Action dated Feb. 15, 2022 in U.S. Appl. No. 16/147,064.
USPTO; Notice of Allowance dated Apr. 18, 2022 in U.S. Appl. No. 16/147,064.
USPTO, Pre-Interview First Office Action dated Apr. 7, 2022 in U.S. Appl. No. 16/147,145.

* cited by examiner

DETAIL A
FIG. 3B

DETAIL B
FIG. 3C

ACTIVE LAMINAR FLOW CONTROL PLENUM PANEL ARRANGEMENT

FIELD

The present disclosure relates to laminar flow control for engine aircraft engine nacelles, and more particularly to systems and methods for plenum structures for laminar flow control systems.

BACKGROUND

A nacelle is the housing for a turbofan gas turbine engine used to power, for example, a commercial airliner. The nacelle and the engine together are referred to as the propulsion system or power plant of the aircraft. The nacelle forms the external aerodynamic surfaces of the propulsion system, and also helps form the duct for the bypass air from the fan, as well as encloses all the components and auxiliary devices surrounding and attached to the engine. The nacelle may also optionally provide a reverse thrust means to generate reverse thrust to slow the aircraft, for example during landing.

SUMMARY

A panel for an active laminar flow control arrangement is disclosed, comprising a longitudinal wall, a sidewall extending from the longitudinal wall, a ridge intersecting the sidewall, a cavity disposed in the panel and at least partially defined by the sidewall and the longitudinal wall, and a division wall disposed in the cavity and extending from the longitudinal wall, wherein the division wall divides the cavity to at least partially define a first plenum and a second plenum.

In various embodiments, the panel further comprises a sealant disposed on an end of the division wall.

In various embodiments, the panel further comprises a flange extending from the sidewall and extending around a perimeter of the panel.

In various embodiments, the division wall is T-shaped.

In various embodiments, the ridge comprises a narrow raised band extending from the longitudinal wall.

In various embodiments, the ridge intersects the sidewall at a first end of the panel and intersects the sidewall at a second end of the panel.

In various embodiments, the first end is opposite the panel from the second end.

In various embodiments, the ridge is oriented parallel with the division wall.

In various embodiments, the panel is made from at least one of a metal, a metal alloy, and a composite material.

In various embodiments, the longitudinal wall, the sidewall, the ridge, and the division wall comprise a single, monolithic piece.

An active laminar flow control arrangement is disclosed, comprising an outer skin having an inner surface, an outer surface, and a perforated area, a panel coupled to the inner surface, comprising a longitudinal wall, a sidewall extending from the longitudinal wall, a ridge intersecting the sidewall, a cavity disposed in the panel and at least partially defined by the sidewall and the longitudinal wall, and a division wall disposed in the cavity and extending from the longitudinal wall, wherein the division wall divides the cavity into a first plenum and a second plenum.

In various embodiments, the inner surface is in fluid communication with the outer surface via the perforated area.

In various embodiments, the cavity is in fluid communication with the outer surface via the perforated area.

In various embodiments, the active laminar flow control arrangement further comprises a sealant disposed on an end of the division wall and the inner surface.

In various embodiments, the panel further comprises a flange extending from the sidewall and extending around a perimeter of the panel.

In various embodiments, the longitudinal wall is oriented substantially parallel with the outer skin.

In various embodiments, the panel is coupled to the outer skin at the flange, the ridge, and the division wall.

A method of installing a laminar flow control arrangement onto a nacelle inlet, comprising disposing a sealant over an end of a division wall of a panel, disposing the panel over an inner surface of an outer skin, the sealant is disposed between the end and the inner surface, coupling a flange of the panel to the outer skin, and coupling a ridge of the panel to the outer skin, wherein the division wall divides a cavity of the panel into a first plenum and a second plenum.

In various embodiments, the method further comprises compressing the sealant between the outer skin and the division wall.

In various embodiments, the flange extends around a perimeter of the panel.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

An active laminar flow control arrangement is disclosed herein, comprising a panel for an inlet outer skin. The panel may define a plurality of plenums for active laminar flow control. The panel may be a one-piece panel, thereby increasing ease of installation and decreasing the number of parts in the arrangement. Furthermore, the panel may provide structural support for the outer skin. In this regard, the outer skin may be devoid of structural stiffeners (e.g., hollow hat stiffeners and/or stringers) at the location of the active laminar flow control ducting. Stated differently, the panel may be installed over a generally smooth inner surface of the outer skin.

The panel may be coupled to the outer skin via a plurality of fasteners (also referred to herein as adhesive fasteners) that are bonded to the inner surface of the outer skin. In this regard, a single nacelle inlet design may be used for nacelles having active laminar flow control or without active laminar flow control since installation of the panel is independent from the nacelle inlet design.

Xyz-axes are provided in certain figures described herein for ease of illustration.

Figure 1A:
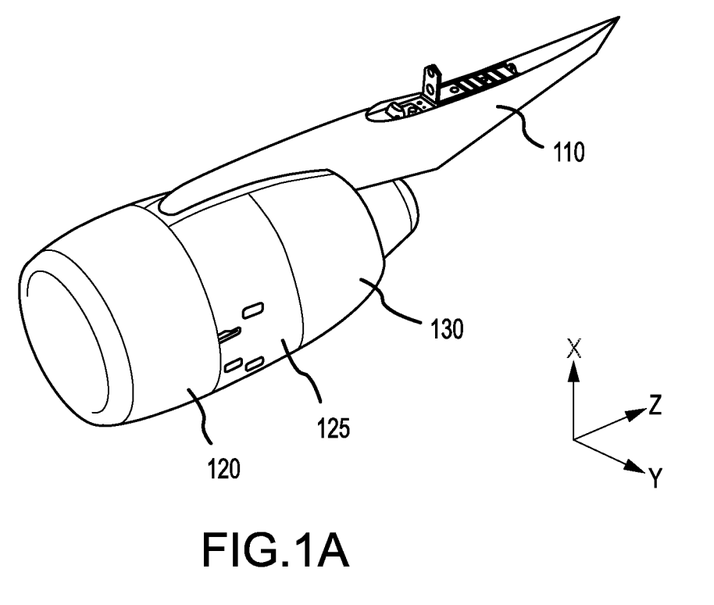
FIG. 1A illustrates a perspective view of a propulsion system and its elements, in accordance with various embodiments.
Figure 1B:
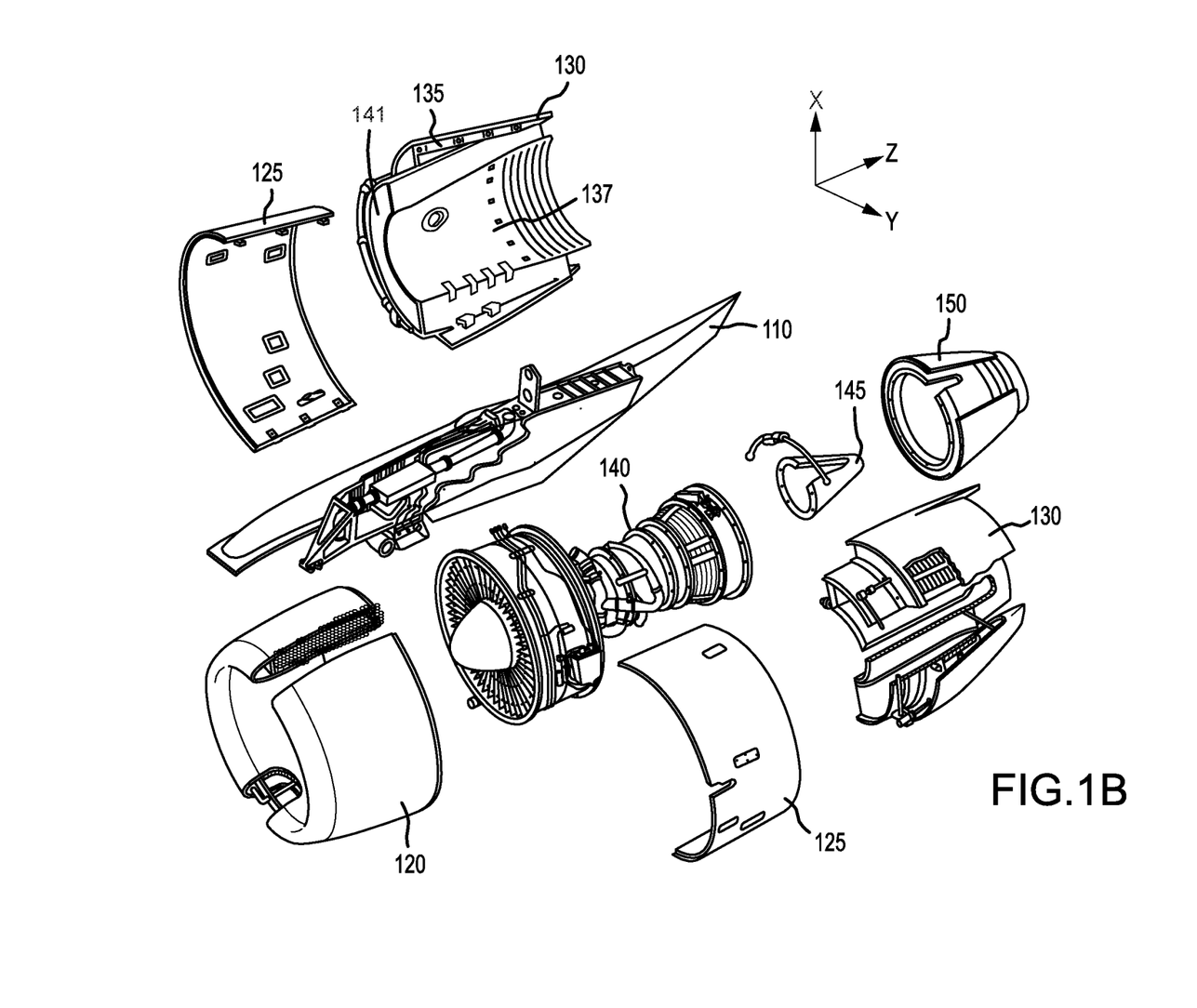
FIG. 1B illustrates an exploded view of the propulsion system and its elements of FIG. 1A, in accordance with various embodiments.

With reference to FIGS. 1A and 1B, a turbofan propulsion system for a commercial jetliner may include an engine 140, a pylon 110, and a nacelle package (also referred to herein as a nacelle) 100. The typical nacelle package, or more simply a nacelle, may comprise an inlet 120, a fan cowl 125, a thrust reverser 130, and an exhaust system including an exhaust cone 145, and exhaust nozzle 150. The nacelle 100 surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle may be C-shaped, and may be principally defined by the exterior surface of the inner fixed structure (IFS) 137 and the inside surface of the outer sleeve 141. If the nacelle includes a typical thrust reverser, the thrust reverser blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110: the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. The thrust reverser 130 comprises an IFS 137 and an outer sleeve 141. The IFS generally surrounds the engine core. As used herein, the outer sleeve 141, though it may have any shape, may generally be a C shaped structure. An exterior surface of the outer sleeve is external to the nacelle. An interior surface of the outer sleeve 141, along with the IFS 137, partially defines a cold flow path of the propulsion system of the aircraft. The IFS 137 and the outer sleeve 141 are typically coupled together and attached to the pylon 110 via a hinge beam 135. As used herein, the IFS 137 is generally referred to as an IFS; however it should be appreciated that a first IFS half may be configured to partially surround an engine core and a second IFS half may be configured to substantially partially surround the remaining engine core.

In operation, an ambient air flow 102 on the exterior of the nacelle 100 generates drag. The drag force tends to increase fuel consumption. Accordingly, it is desirable to minimize the drag.

If the flow around the nacelle 100 is laminar the drag force will be reduced compared to a turbulent flow. Aircraft and nacelle designers have utilized nacelle external aerodynamic shapes that maintain a natural laminar flow over a portion of the nacelle 100. By carefully selecting the aerodynamic profile, natural laminar flow can be achieved. The portion where it is desired to achieve laminar flow should be clean of debris and aerodynamically smooth (e.g., fastener heads should be flush and parallel with the surrounding surface). Steps and gaps can cause the laminar flow to trip and transition to turbulent flow. Other active or hybrid natural/active techniques have been proposed for achieving and maintaining laminar flow on an aircraft nacelle and other aircraft surfaces. One such technique is through boundary layer ingestion or suction where the boundary layer next to the aircraft surface is pulled through small holes in the surface to remove the low energy boundary layer and regenerate it or maintain it at a minimum or near minimum energy level. Active or hybrid laminar flow techniques may achieve and maintain laminar flow more consistently than natural means alone, and may be able to extend further aft the region of nacelle 100 which has laminar flow.

Figure 2:
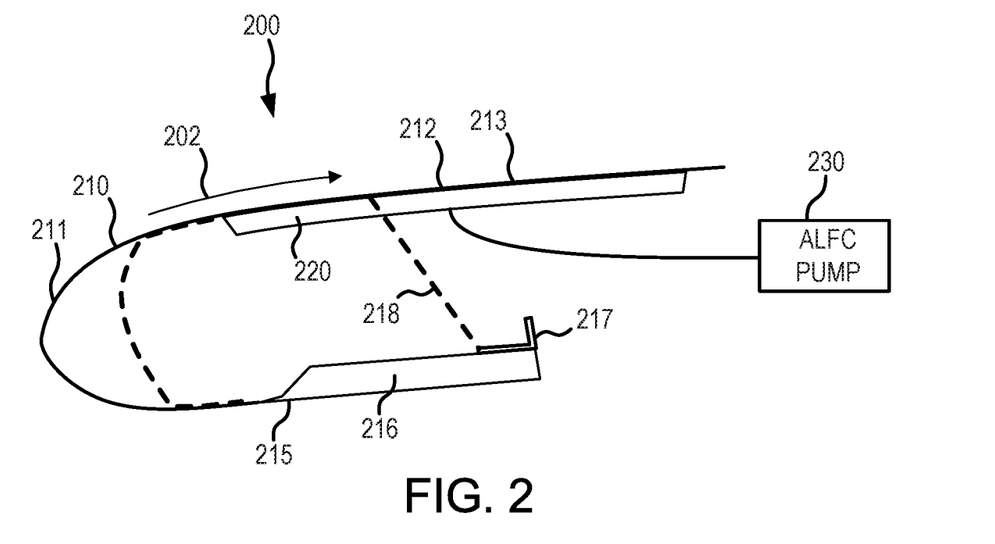
FIG. 2 illustrates a schematic section view of a nacelle inlet having an active laminar flow control arrangement, in accordance with various embodiments.

With reference to FIG. 2, a schematic view of an active laminar flow control arrangement 200 is illustrated, in accordance with various embodiments. In various embodiments, active laminar flow control arrangement 200 includes a nacelle inlet 210. Nacelle inlet 210 may be similar to nacelle inlet 120 of FIG. 1. A laminar flow control duct arrangement 220 may be coupled to nacelle inlet 210. Laminar flow control duct arrangement 220 may be in fluid communication with a plurality of orifices (i.e., perforations) 213 disposed in the outer skin 212 of nacelle inlet 210. In various embodiments, outer skin 212 defines an outer aerodynamic surface of nacelle inlet 210. Laminar flow control duct arrangement 220 may be in fluid communication with a pump 230 whereby an ambient airflow 202 is drawn into laminar flow control duct arrangement 220 from outside of nacelle inlet 210 through orifices 213. Pump 230 may be a fluid (e.g., air) pump. Pump 230 may be mounted to a fan case. It is appreciated that the location of pump 230 is not particularly limited. In this manner, a laminar or near laminar flow may be maintained over nacelle inlet 210, thereby increasing the aerodynamic performance of the nacelle inlet 210. It is appreciated that the present disclosure may be useful for an active laminar flow control system for any desirable aerodynamic surface of an aircraft or any suitable portion of a nacelle, such as the fan cowl for example.

In various embodiments, nacelle inlet 210 comprises an inner barrel 215. Nacelle inlet 210 may comprise a nose lip 211. Inner barrel 215 may be coupled to outer skin 212 via nose lip 211. In various embodiments, inner barrel 215 may be acoustically treated. In various embodiments, nacelle inlet 210 includes an acoustic liner 216 coupled to inner barrel 215. Nacelle inlet 210 may include an attachment ring 217. Nacelle inlet 210 may be configured to be coupled to an adjacent fan case via attachment ring 217. Nacelle inlet 210 may include an aft bulkhead 218 extending between attachment ring 217 and outer skin 212.

Figure 3A:
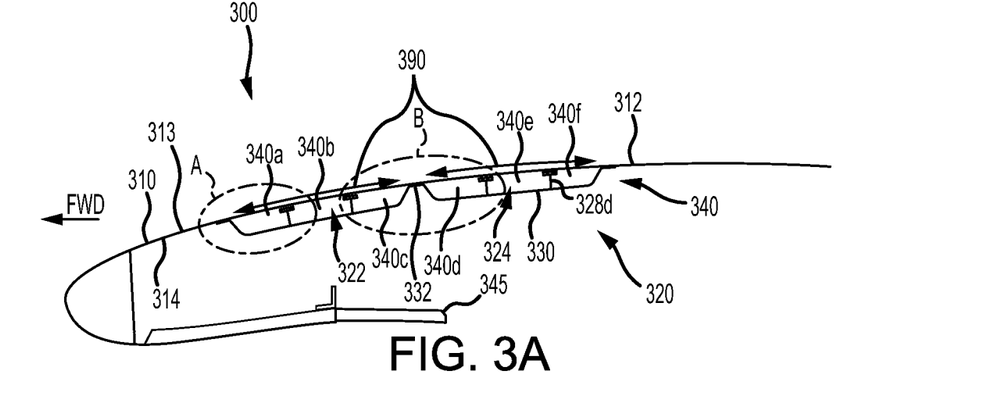
FIG. 3A, FIG. 3B, and FIG. 3C illustrate a section view of a nacelle inlet having an active laminar flow control arrangement, in accordance with various embodiments.
Figure 3B:
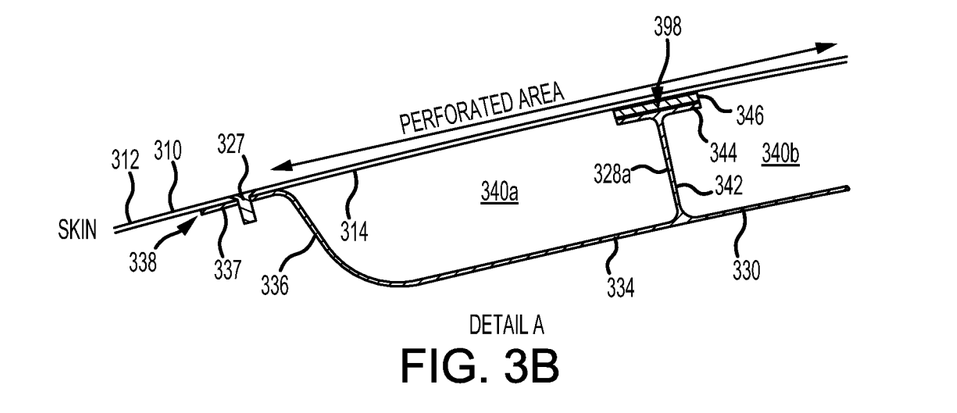
Figure 3C:
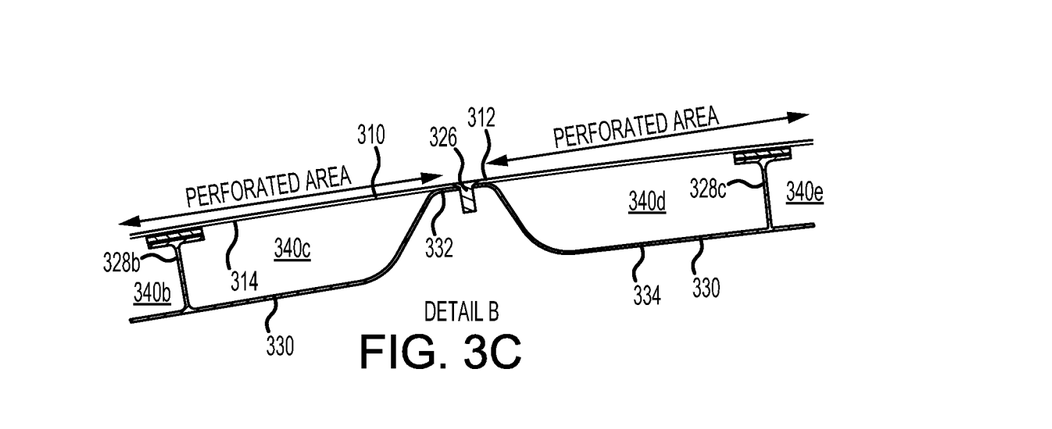

With combined reference to FIG. 3A, FIG. 3B, and FIG. 3C, a section view of an active laminar flow control arrangement 300 is illustrated, in accordance with various embodiments. In various embodiments, active laminar flow control arrangement 300 includes a nacelle inlet 310. Nacelle inlet 310 may be similar to nacelle inlet 210 of FIG. 2. Nacelle inlet 310 may be coupled to a fan case 345. A laminar flow control duct arrangement 320 may be coupled to nacelle inlet 310. An outer skin 312 of nacelle inlet 310 may comprise a perforated area 390. Laminar flow control duct arrangement 320 may receive a flow of air through the perforated area 390 of outer skin 312. Outer skin 312 may comprise an outer surface 313 and an inner surface 314. Perforated area 390 may comprise a plurality of perforations placing outer surface 313 in fluid communication with inner surface 314.

Active laminar flow control arrangement 300 may comprise a panel 330 coupled to inner surface 314 and defining one or more cavities (e.g., cavity 322 and cavity 324) disposed between panel 330 and inner surface 314 of outer skin 312. In various embodiments, panel 330 may comprise a ridge 332 disposed between cavity 322 and cavity 324. Stated differently, cavity 322 may be separated from cavity 324 by ridge 332.

With particular focus on FIG. 3C, panel 330 may be coupled to outer skin 312 via ridge 332. A plurality of fasteners 326 may be coupled between outer skin 312 and panel 330 at ridge 332. In various embodiments, fasteners 326 are rivets or the like. Ridge 332 may comprise a plurality of orifices for receiving fasteners 326. In various embodiments, fasteners 326 are countersunk into outer skin 312 such that fasteners 326 are flush with outer skin 312. In this regard, ridge 332 may be in direct contact with outer skin 312 in the installed position. Sheer forces may be transferred between panel 330 and outer skin 312 via fasteners 326.

In various embodiments, panel 330 may comprise a longitudinal wall 334 extending substantially parallel with respect to outer skin 312. Ridge 332 may comprise a narrow raised band extending from longitudinal wall 334.

With particular focus on FIG. 3B, panel 330 may comprise sidewall 336 and a flange 337 extending from the sidewall 336 and extending around the perimeter 338 of panel 330. A plurality of fasteners 327 may be coupled between outer skin 312 and panel 330 at flange 337. Flange 337 may comprise a plurality of orifices for receiving fasteners 327. In various embodiments, fasteners 327 are rivets or the like. In various embodiments, fasteners 327 are countersunk into outer skin 312 such that fasteners 327 are flush with outer skin 312. Flange 337 may be in direct contact with outer skin 312 in the installed position. Sheer forces may be transferred between panel 330 and outer skin 312 via fasteners 327.

With continued combined reference to FIG. 3A, FIG. 3B, and FIG. 3C, panel 330 may comprise one or more division walls (e.g., division wall 328a, division wall 328b, division wall 328c, and division wall 328d). The division walls may divide cavity 322 and/or cavity 324 into a plurality of plenums (e.g., plenum 340a, plenum 340b, plenum 340c, plenum 340d, plenum 340e, and plenum 340f). Division wall 328a may divide cavity 322 into plenum 340a and plenum 340b. Division wall 328b may divide cavity 322 into plenum 340b and plenum 340c. Division wall 328c may divide cavity 324 into plenum 340d and plenum 340e. Division wall 328d may divide cavity 324 into plenum 340e and plenum 340f.

Laminar flow control duct arrangement 320 may receive a flow of air through the perforated area 390 of outer skin 312 into each plenum (e.g., plenum 340a, plenum 340b, plenum 340c, plenum 340d, plenum 340e, and plenum 340f). In various embodiments, the pressure of air in each plenum varies.

In various embodiments, division wall 328a, division wall 328b, division wall 328c, and/or division wall 328d may extend from longitudinal wall 334 towards outer skin 312 in the installed position. The division walls and longitudinal wall 334 may comprise a single monolithic piece. In various embodiments, the division walls may be cured to longitudinal wall 334, for example during a carbon fiber composite layup process. In various embodiments, the division walls may be bonded to longitudinal wall 334. In various embodiments, the division walls may be welded to longitudinal wall 334, for example where panel 330 is made from a metal or metal alloy. It is appreciated that the method of attachment of the division walls to longitudinal wall 334 is not particularly limited.

In various embodiments, division wall 328a, division wall 328b, division wall 328c, and/or division wall 328d may comprise a T-shaped structure. With particular focus on division wall 328a, the divisional walls may comprise a first wall 342 extending substantially orthogonal to longitudinal wall 334 and a second wall 344 extending substantially orthogonal to first wall 342, thereby forming the T-shaped structure. A sealant 346 may be disposed on an end 398 of the division walls (i.e., division wall 328a, division wall 328b, division wall 328c, and/or division wall 328d). Sealant 346 may be compressed between the division walls and outer skin 312. In various embodiments, sealant 346 is a class-B sealant such as a polysulfide-based sealant for example. Sealant 346 may aid in sealing panel 330 to outer skin 312. Sealant 346 may aid in hermetically sealing panel 330 to outer skin 312. Division wall 328a, division wall 328b, division wall 328c, and/or division wall 328d may aid in structurally supporting outer skin 312, particularly against external pressure loading on outer skin 312. Stated differently, division wall 328a, division wall 328b, division wall 328c, and/or division wall 328d may support outer skin 312 from deflecting towards panel 330.

Panel 330 may provide structural support to outer skin 312. Panel 330 may provide torsion rigidity, bending stiffness, and buckling resistance to nacelle inlet 310.

Figure 4:
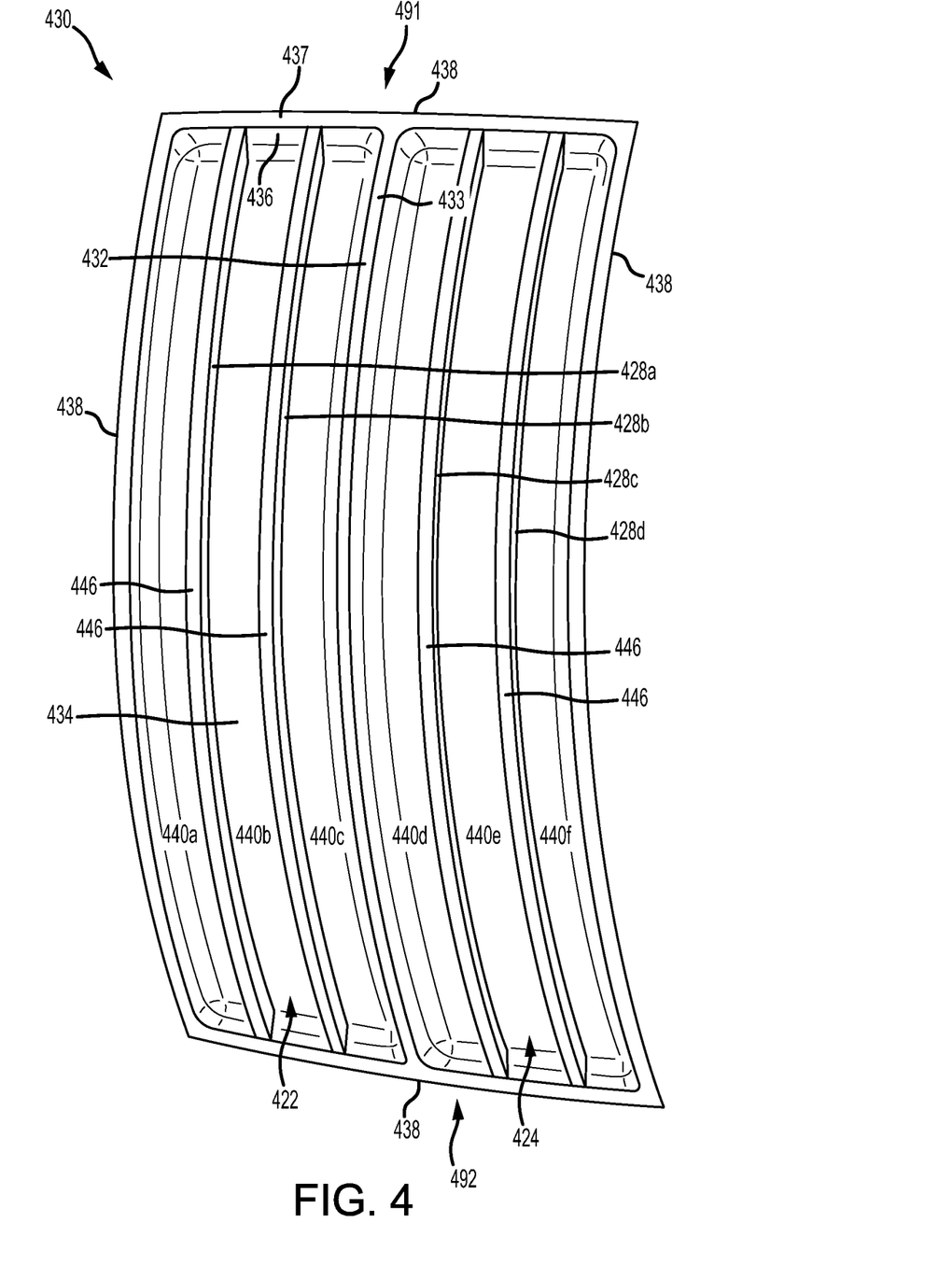
FIG. 4 illustrates a perspective view of a panel for an active laminar flow control arrangement, in accordance with various embodiments.

With reference to FIG. 4, a perspective view of a panel 430 is illustrated, in accordance with various embodiments. Panel 430 may be similar to panel 330 of FIG. 3A. Panel 430 may define a cavity 422 and a cavity 424. Panel 430 may comprise a ridge 432 disposed between cavity 422 and cavity 424. Stated differently, cavity 422 may be separated from cavity 424 by ridge 432. Cavity 422 and cavity 424 may be partially defined by ridge 432. Panel 430 may comprise a longitudinal wall 434. Ridge 432 may comprise a narrow raised band 433 extending from longitudinal wall 434. Ridge 432 may extend from a first end 491 of panel 430 to a second end 492 of panel 430. Panel 430 may comprise sidewall 436 and a flange 437 extending from the sidewall 436 and extending around the perimeter 438 of panel 430. Ridge 432 may intersect sidewall 436 at first end 491. Ridge 432 may intersect sidewall 436 at second end 492. In this regard, sidewall 436 may extend around the entire perimeter of panel 430.

Panel 430 may comprise one or more division walls (e.g., division wall 428a, division wall 428b, division wall 428c, and division wall 428d). The division walls may divide cavity 422 and/or cavity 424 into a plurality of plenums (e.g., plenum 440a, plenum 440b, plenum 440c, plenum 440d, plenum 440e, and plenum 440f. Division wall 428a may divide cavity 422 into plenum 440a and plenum 440b. Division wall 428b may divide cavity 422 into plenum 440b and plenum 440c. Division wall 428c may divide cavity 424 into plenum 440d and plenum 440e. Division wall 428d may divide cavity 424 into plenum 440e and plenum 440f In various embodiments, the division walls are oriented parallel with ridge 432.

A sealant 446 may be disposed on the division walls (i.e., division wall 428a, division wall 428b, division wall 428c, and/or division wall 428d).

In various embodiments, panel 430 may be made of a composite material such as carbon fiber, a glass fiber, and/or an aramid fiber. In this regard, panel 430 may be formed during a carbon fiber layup process. In various embodiments, panel 430 may be made of a metal or metal alloy, such as aluminum for example. In this regard, panel 430 may be formed via a metal stamping process or a hydroforming process, among other processes.

Figure 5:
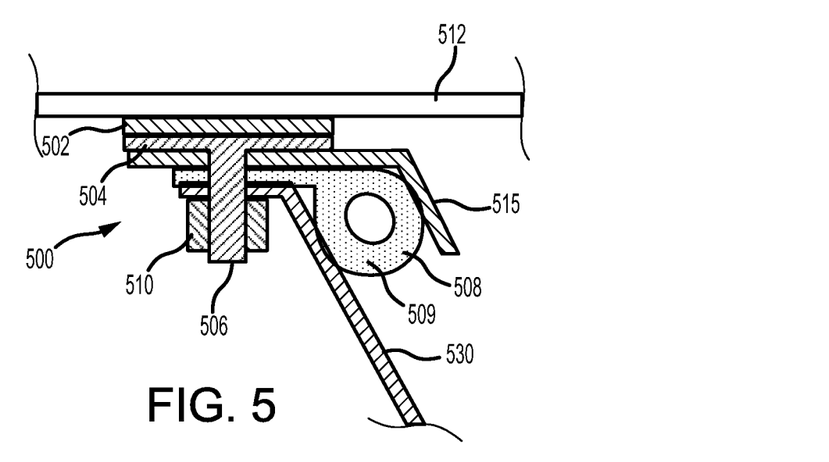
FIG. 5, FIG. 6, and FIG. 7 illustrate a panel coupled to an outer skin via an adhesive fastener, in accordance with various embodiments.

With reference to FIG. 5, a panel 530 coupled to an outer skin 512 is illustrated, in accordance with various embodiments. Having mentioned that an outer skin may be coupled to a panel via a fastener such as a rivet, it is further contemplated herein that an outer skin an outer skin may be coupled to a panel via an adhesive fastener 500. Examples of a suitable adhesive fastener may include one or more of the fastening products available from Click Bond, Inc. of Carson City, Nev., USA.

In various embodiments, adhesive fastener 500 may comprise a baseplate 504 and a threaded stud 506 extending from the baseplate 504. The baseplate 504 may be coupled to outer skin 512 via an adhesive 502. A seal 508 may be placed around the threaded stud 506 and over baseplate 504. Panel 530 may be fitted around threaded stud 506 and a nut 510 may be threadingly coupled to threaded stud 506 to compress panel 530 between nut 510 and seal 508.

In various embodiments, a liner 515 may be placed over threaded stud 506 an coupled between seal 508 and baseplate 504. A bulb portion 509 of seal 508 may be compressed between liner 515 and panel 530. Liner 515 may be made from a metal material or a composite material. In various embodiments, fasteners 326 and/or fasteners 327 (see FIG. 3B and FIG. 3C) may be similar to adhesive fastener 500.

Figure 6:
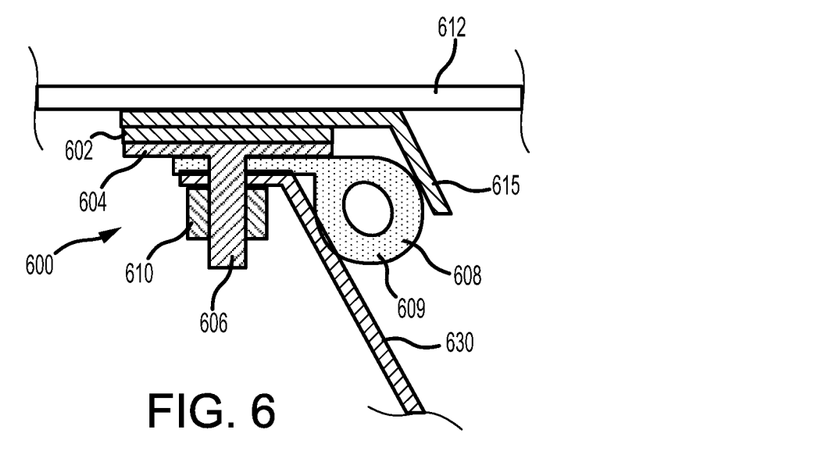

With reference to FIG. 6, a panel 630 coupled to an outer skin 612 via an adhesive fastener 600 is illustrated, in accordance with various embodiments. In various embodiments, adhesive fastener 600 may be similar to adhesive fastener 500 of FIG. 5, except that the liner 615 of adhesive fastener 600 is coupled between baseplate 604 of threaded stud 606 and outer skin 612. Bulb portion 609 of seal 608 may be compressed between liner 615 and panel 630. Liner 615 may be made from a metal material or a composite material. Liner 615 may be bonded to outer skin 612 via an adhesive. The baseplate 604 may be bonded to liner 615 via an adhesive 602. Panel 630 may be fitted around threaded stud 606 and a nut 610 may be threadingly coupled to threaded stud 606 to compress panel 630 between nut 610 and seal 608. In various embodiments, fasteners 326 and/or fasteners 327 (see FIG. 3B and FIG. 3C) may be similar to adhesive fastener 600.

Figure 7:
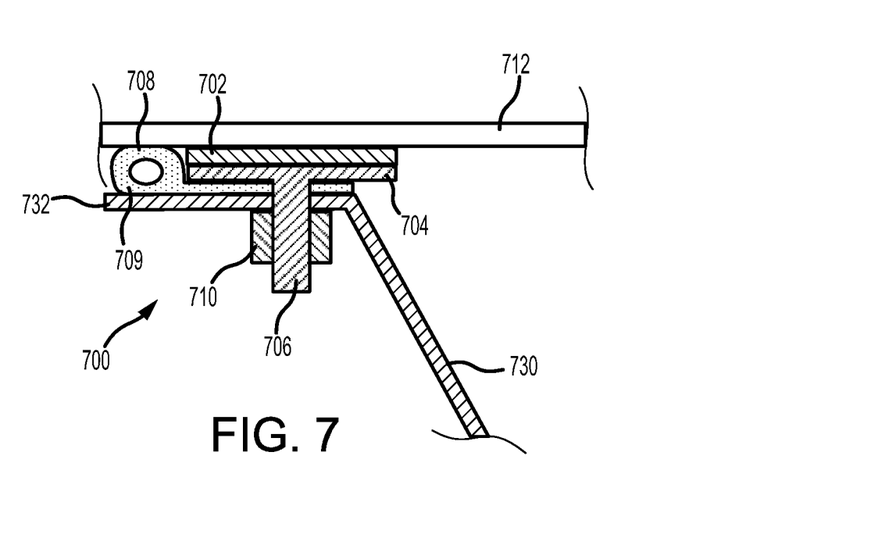

With reference to FIG. 7, a panel 730 coupled to an outer skin 712 via an adhesive fastener 700 is illustrated, in accordance with various embodiments. In various embodiments, adhesive fastener 700 may be similar to adhesive fastener 500 of FIG. 5, except that instead of being compressed between a liner and the panel 730, bulb portion 709 of seal 708 is compressed between flange 732 of panel 730 and outer skin 712. The baseplate 704 may be bonded to outer skin 712 via an adhesive 702. Panel 730 may be fitted around threaded stud 706. A nut 710 may be threadingly coupled to threaded stud 706 to compress panel 730 between nut 710 and seal 708. In various embodiments, fasteners 326 and/or fasteners 327 (see FIG. 3B and FIG. 3C) may be similar to adhesive fastener 700.

Figure 8:
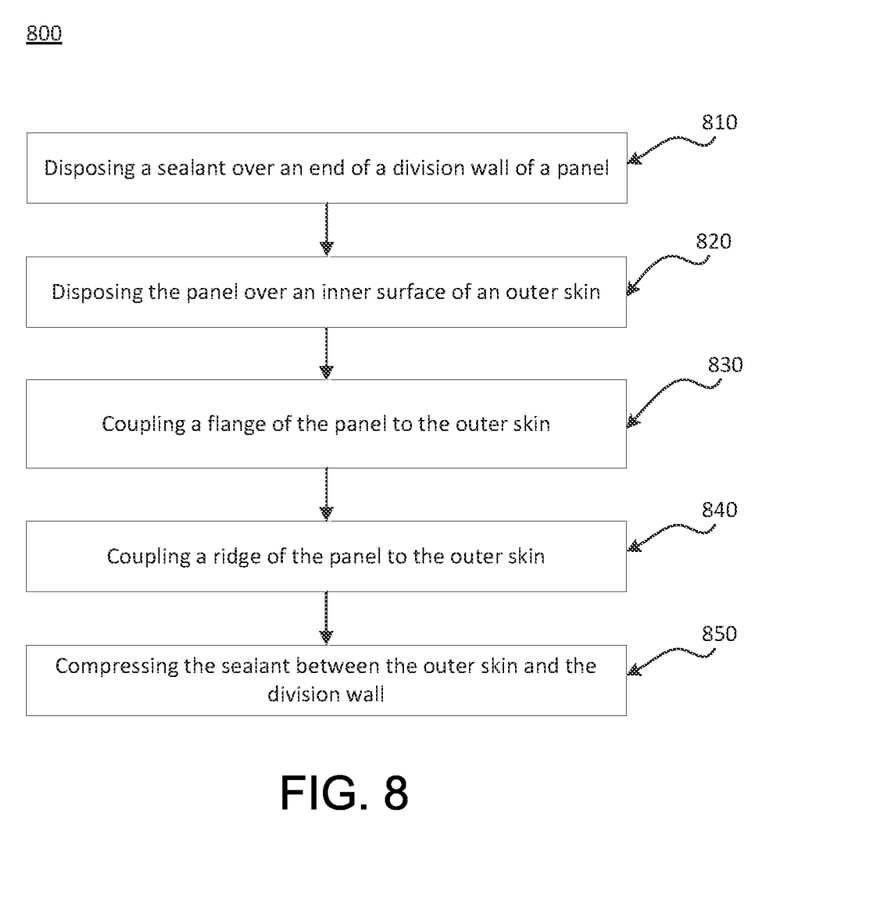
FIG. 8 illustrates a flow chart for a method for installing a laminar flow control arrangement onto a nacelle inlet, in accordance with various embodiments.

With reference to FIG. 8, a method 800 for installing an active laminar flow control arrangement onto a nacelle inlet is illustrated, in accordance with various embodiments. Method 800 includes disposing a sealant over an end of a division wall of a panel (step 810). Method 800 includes disposing the panel over an inner surface of an outer skin (step 820). Method 800 includes coupling a flange of the panel to the outer skin (step 830). Method 800 includes coupling a ridge of the panel to the outer skin (step 840). Method 800 includes compressing the sealant between the outer skin and the division wall (step 850).

With combined reference to FIG. 3B, FIG. 3C, and FIG. 8, step 810 may include disposing sealant 346 over end 398 of division wall 328a of panel 330. Step 820 may include disposing panel 330 over inner surface 314 of outer skin 312. Step 830 may include coupling flange 337 of panel 330 to outer skin 312. Step 830 may include coupling flange 337 of panel 330 to outer skin 312 via fasteners 327. Step 840 may include coupling ridge 332 of panel 330 to outer skin 312. Step 840 may include coupling ridge 332 of panel 330 to outer skin 312 via fasteners 327. Step 850 may include compressing sealant 346 between the outer skin 312 and division wall 328a. Sealant 346 may be compressed between the outer skin 312 and division wall 328a in response to tightening fasteners 326 and/or fasteners 327. Sealant 346 may be compressed between the outer skin 312 and division wall 328a by applying a force, for example by hand or by rollers, to panel 330.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A panel for an active laminar flow control arrangement, comprising:
   a longitudinal wall;
   a sidewall extending from the longitudinal wall;
   a ridge intersecting the sidewall;
   a cavity disposed in the panel and at least partially defined by the sidewall and the longitudinal wall;
   a division wall disposed in the cavity and extending substantially orthogonally from the longitudinal wall, wherein the division wall comprises a first wall extending from the longitudinal wall and a second wall defining an end of the division wall and extending substantially orthogonal to the first wall, thereby forming a T-shaped structure, the division wall divides the cavity to at least partially define a first plenum and a second plenum; and
   a sealant disposed on the end of the division wall;
   wherein the division wall is oriented parallel to the ridge.

2. The panel for an active laminar flow control arrangement of claim 1, further comprising a flange extending from the sidewall and extending around a perimeter of the panel.

3. The panel for an active laminar flow control arrangement of claim 1, wherein the ridge comprises a raised band extending from the longitudinal wall.

4. The panel for an active laminar flow control arrangement of claim 1, wherein the ridge intersects the sidewall at a first end of the panel and intersects the sidewall at a second end of the panel.

5. The panel for an active laminar flow control arrangement of claim 4, wherein the first end is opposite the panel from the second end.

6. The panel for an active laminar flow control arrangement of claim 1, wherein the ridge is oriented parallel with the division wall.

7. The panel for an active laminar flow control arrangement of claim 1, wherein the panel is made from at least one of a metal, a metal alloy, and a composite material.

8. The panel for an active laminar flow control arrangement of claim 1, wherein the longitudinal wall, the sidewall, the ridge, and the division wall comprise a single, monolithic piece.

9. An active laminar flow control arrangement, comprising:
   an outer skin having an inner surface, an outer surface, and a perforated area;
   a panel coupled to the inner surface, comprising:
   a longitudinal wall;
   a sidewall extending from the longitudinal wall;
   a ridge intersecting the sidewall;
   a cavity disposed in the panel and at least partially defined by the sidewall and the longitudinal wall;
   a division wall disposed in the cavity and extending substantially orthogonally from the longitudinal wall, wherein the division wall comprises a first wall extending from the longitudinal wall and a second wall defining an end of the division wall and extending substantially orthogonal to the first wall, thereby forming a T-shaped structure, the division wall divides the cavity into a first plenum and a second plenum; and
   a sealant disposed on the end of the division wall;
   wherein the division wall is oriented parallel to the ridge.

10. The active laminar flow control arrangement of claim 9, wherein the inner surface is in fluid communication with the outer surface via the perforated area.

11. The active laminar flow control arrangement of claim 10, wherein the cavity is in fluid communication with the outer surface via the perforated area.

12. The active laminar flow control arrangement of claim 11, wherein the panel further comprises a flange extending from the sidewall and extending around a perimeter of the panel.

13. The active laminar flow control arrangement of claim 12, wherein the panel is coupled to the outer skin at the flange, the ridge, and the division wall.

14. The active laminar flow control arrangement of claim 11, wherein the longitudinal wall is oriented substantially parallel with the outer skin.

15. The active laminar flow control arrangement of claim 9, wherein the sealant is compressed between the end of the division wall and the inner surface, and the ridge extends from the longitudinal wall to the inner surface.

16. The active laminar flow control arrangement of claim 9, wherein the ridge comprises a raised band extending from the longitudinal wall.

17. A method of installing a laminar flow control arrangement onto a nacelle inlet, comprising:
- disposing a sealant over an end of a division wall of a panel, wherein the division wall comprises a first wall and a second wall, the second wall defines the end of the division wall and extends substantially orthogonal to the first wall, thereby forming a T-shaped structure;
- disposing the panel over an inner surface of an outer skin, the sealant is disposed between the end and the inner surface;
- coupling a flange of the panel to the outer skin with a first fastener located at the flange; and
- coupling a ridge of the panel to the outer skin with a second fastener located at the ridge, wherein the division wall divides a cavity of the panel into a first plenum and a second plenum.

18. The method of claim 17, further comprising compressing the sealant between the outer skin and the division wall.

19. The method of claim 17, wherein the flange extends around a perimeter of the panel.

* * * * *